United States Patent

[11] 3,622,933

[72] Inventor Jan A. Van Den Broek
　　　　　　　Ann Arbor, Mich.
[21] Appl. No. 756,494
[22] Filed Aug. 30, 1968
[45] Patented Nov. 23, 1971
[73] Assignee Transidyne General Corporation
　　　　　　　Ann Arbor, Mich.

[54] ELECTROMECHANICAL VIBRATING REED DEVICE
2 Claims, 7 Drawing Figs.

[52] U.S. Cl. .................................................. 338/5,
　　　　　　　　　　　　　　　　　　　　　　310/8.2
[51] Int. Cl. ................................................... G01l 1/18
[50] Field of Search ........................................ 338/5, 6;
　　　　　　　　　　　　　　　　　　　　　　310/8.2

[56] References Cited
UNITED STATES PATENTS
3,314,035 4/1967 Sanchez ....................... 338/5 X
3,479,739 11/1969 Stedman ....................... 338/6 X
2,875,353 2/1959 Cavalieri, Jr. et al. ........ 310/8.2

OTHER REFERENCES
" Semiconductors in Strain Gauges" by W. P. Mason, Bell Laboratories Record, Vol. 37, 1959, pp. 7- 9, copy in 338/6.

*Primary Examiner*—Malcolm F. Hubler
*Attorney*—Hauke, Krass, Gifford and Patalidis ABSTRACT: An electromechanical vibrating reed device having a vibrating reed member with an end thereof clamped in a base member. The reed member is provided with a transducer consisting of a substantially thin film of a piezoresistive material having a resistivity varying as a function of the mechanical stress imposed thereon disposed at a portion of the reed member subjected to maximum bending during oscillation or vibration of the reed member. A DC current flowing across the piezoresistive thin film is modulated in amplitude as a function of the amplitude of vibration of the reed member at a frequency corresponding to the natural resonant frequency of vibration of the reed member, and such modulated signal may be utilized to drive the reed member such as to sustain oscillation of the reed member.

PATENTED NOV 23 1971
3,622,933
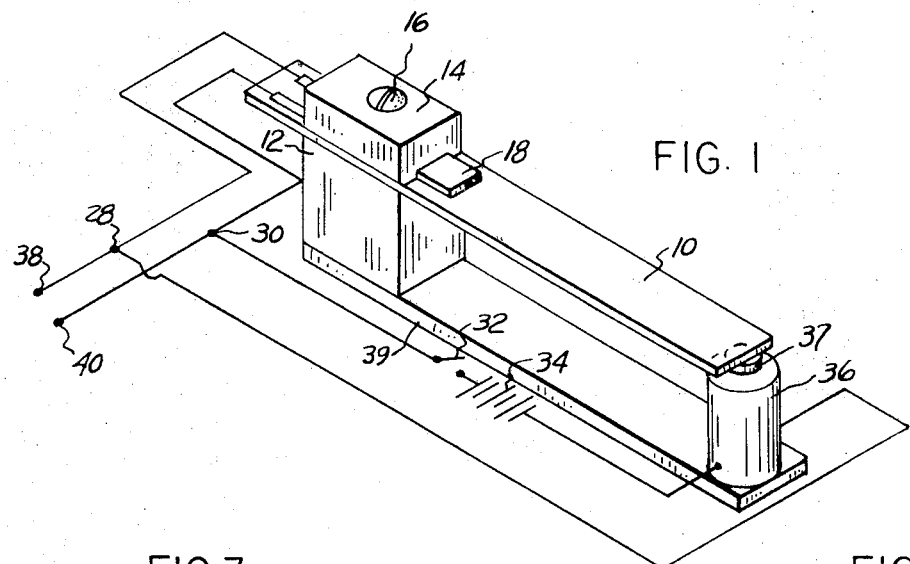
FIG. 1
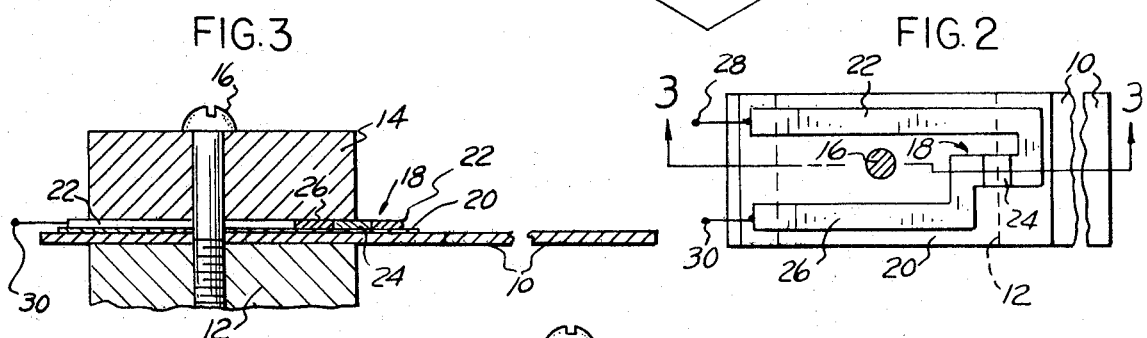
FIG. 3　　　　　FIG. 2
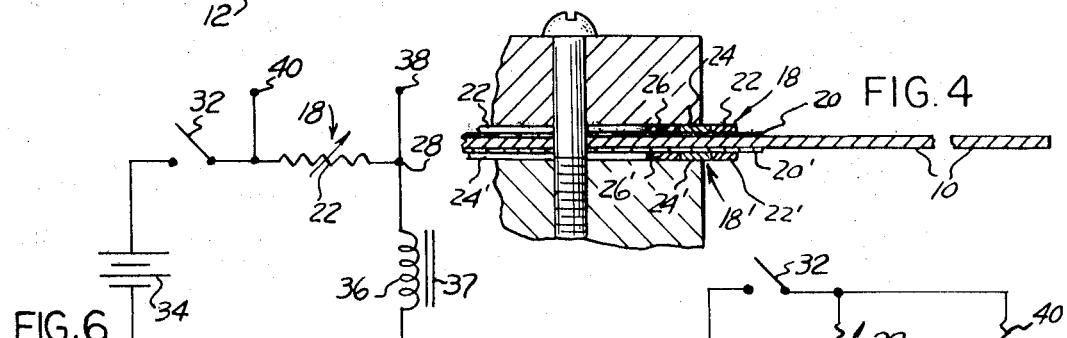
FIG. 4
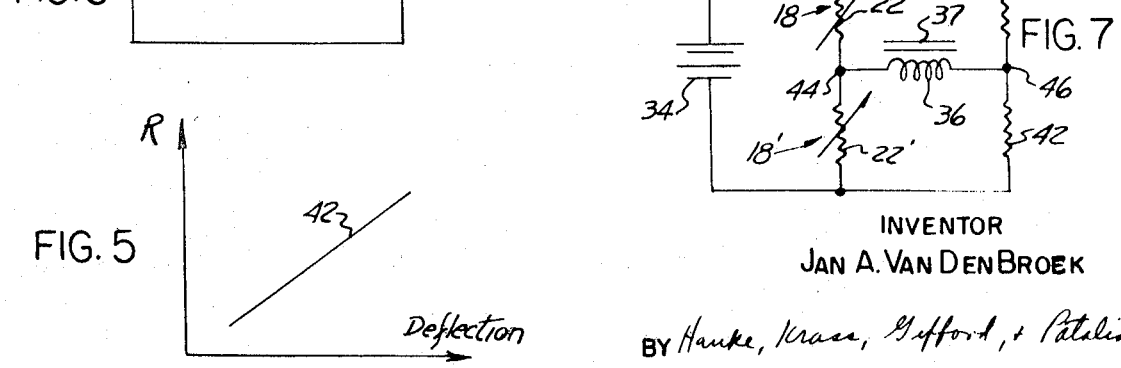
FIG. 6
FIG. 5
FIG. 7
INVENTOR
JAN A. VAN DEN BROEK
BY Hauke, Krass, Gifford, & Patalidi
ATTORNEYS

ELECTROMECHANICAL VIBRATING REED DEVICE

BACKGROUND OF THE INVENTION

The invention relates to the art of frequency-sensitive electromechanical devices employing a vibratory reed member as the frequency-sensitive element.

It is well known that a reed formed of an elongated member oscillators resilient material rigidly supported at an end may be caused to oscillate or vibrate by applying to the free end of the reed member a periodic excitation, electromagnetic, electrostatic or mechanical, having a frequency proximate the natural resonant frequency of the reed. Vibrating reed devices have many applications in frequency standards or calibrators, frequency meters, electromechanical oscillators or resonators, frequency bandwidth filters, etc. A common problem with prior art vibratory reed devices relates to the difficulty of determining with precision the frequency and amplitude at which the reed member vibrates without influencing the quality factor, or Q, of the device, such Q being defined as the ratio of the energy stored in the vibrating reed device to the energy dissipated per cycle.

Another problem associated with prior art vibrating reed devices relates to the difficulty of providing an output transducer pickup for supplying a signal of a frequency determined by the frequency of oscillation of a reed member. Prior art output transducers comprise make-and-break contacts operated by the vibrating or oscillating portion of the reed member, variable reluctance coil whose reluctance is periodically varied as a result of the oscillation of the free end of the reed member, piezoelectrical elements disposed at a nonnodal point on the reed member, generally in engagement with the rigidly supported end thereof, and the like. In addition to tending to destroy the high Q of the vibrating reed member, such output transducers, as used in the prior art, are generally temperature sensitive, have a strong dampening effect, may be sometimes influenced by moisture, cause unwanted eddy currents, and may have characteristics varying with aging.

A further problem associated with prior art devices is concerned with providing such devices with a driving arrangement that is capable of supplying an increment of energy per cycle of oscillation of the vibrating reed with the appropriate frequency and phase to sustain continuous oscillation of the reed member at a frequency coinciding substantially with its natural resonant frequency.

SUMMARY OF THE INVENTION

The present invention eliminates these and other disadvantages of prior art devices which have considerably limited the usefulness of electromechanical devices utilizing vibrating reed members, the objects of the present invention being accomplished by means of a vibratory reed structure provided with a thin film of piezoresistive material attached to at least one face of the reed surface at a point of maximum bending of the reed member during oscillation of the free end thereof. A predetermined frequency output signal appears across the piezoresistive thin film when a DC current signal is applied thereacross, and the device is preferably caused to function in a closed loop mode wherein the output signal is utilized to control the exciting or driving element causing the reed member to vibrate.

The many objects and advantages of the present invention will become apparent when the following description of some examples of the best modes contemplated to practice the invention is read in conjunction with the accompanying drawings wherein:

BRIEF DESCRIPTION OF THE DRAWINGS

FIG. 1 is a schematic representation of an electromechanical vibrating reed device according to the present invention;

FIG. 2 is a schematic top plan view of the stationary or mounting end of a vibratory reed member according to the present invention including the piezoresistive transducer associated therewith with the reed-clamping means removed for the sake of clarity;

FIG. 3 is a schematic sectional view substantially along line 3—3 of FIG. 2;

FIG. 4 is a modification of the arrangement of FIG. 3;

FIG. 5 is a graph showing the variation of resistivity of the piezoresistive transducer of the present invention in function of the amount of deflection of the reed member;

FIG. 6 is a schematic electrical equivalent circuit diagram of the arrangement of FIG. 1; and FIG. 7 is a schematic circuit diagram of a modification of the circuit diagram of FIG. 6 for use with the modification of the invention of FIG. 4.

DETAILED DESCRIPTION OF THE PREFERRED EMBODIMENTS

An example of embodiment of the present invention is shown in FIG. 1 as comprising a reed member 10 having an end rigidly fastened to a relatively massive base 12, being held therein by means of a clamping member 14 held in position by clamping screw 16, or any other appropriate convenient means. The reed member 10 may be made of any appropriate material having a substantially high modulus of elasticity, the freely vibrating length, the thickness and width of the material being selected to provide the reed member 10 with an appropriate natural resonant frequency. Such an appropriate material for the reed member 10 consists preferably of any alloy having a modulus of elasticity substantially constant in spite of temperature variation. Such a material may be, for example, an alloy consisting principally of 42 percent nickel, 50 percent iron, and 5.5 percent chromium, made by Engelhardt Industries, Inc., and sold under the trade name of Nispan.

The reed member 10 is provided at a portion of maximum bending during oscillation, such portion being preferably the end clamped in the base member 12, with a piezoresistive transducer, generally designated at 18, disposed on at least one face of the reed member. As shown in more detail in an exaggerated manner in FIGS. 2 and 3, the piezoresistive transducer 18 consists of a dielectric coating 20 on a portion of the surface of the reed member 10 and deposited thereon by any convenient means such as vacuum evaporation, spraying, cathode sputtering, or the like, through an appropriate mask. The dielectric thin film 20 has preferably a thickness of about 1,000 to 2,000 angstroms and consists of any convenient material such as a polyimide, plastic, silicon dioxide or like material. The dielectric thin film 20 is in turn provided with an adhering coating of a current conductive material such as gold, silver or the like, forming a first electrode 22, for a thin film 24 of a piezoresistive material in turn provided with a second electrode 26 similar to the first electrode 22. An appropriate material to form the piezoresistive thin film portion 24 may be selected from a variety of P-type polycrystaline semiconductor materials, such a P-type germanium for example. The thin film 24 of piezoresistive material is deposited, as well as the electrodes 22 and 26, by any convenient method such as vacuum evaporation, spraying, cathode sputtering and the like, through an appropriate mask. The piezoresistive thin film is positioned so as to be subjected to maximum stress during deflection of the reed 20, preferably, as best shown in FIG. 2, by being positioned so as to straddle the forward edge of the support base 12.

The electrodes 22 and 26 are provided with terminals 28 and 30 for connection of the piezoresistive transducer 18 to a utilization circuit. For practical applications the terminals 28 and 30 are connected, as shown in FIGS. 1 and 6, through a switch 32 to a source of DC power or battery 34 and to an excitation coil 36 mounted on the end of an extension 39 of base 12, excitation coil 36 being provided with an appropriate core such as core 37. When switch 32 is closed, electrical current is caused to circulate in the series circuit, FIGS. 1 and 6, and coil 36 induces a magnetic field in the airgap of core 37 that deflects the reed member 10. The deflection of reed member 10 stresses the piezoresistive material forming the thin film 22 of the transducer 18, thus causing an increase of resistivity of the material which in turn cause a decrease in the current flowing in the series circuit. The decrease of current flow through coil 36 causes the magnetic field in the airgap of magnetic core 37 to partially collapse thus allowing the reed 10 to be displaced in an opposite direction, thus causing a decrease of the resistivity of the piezoresistive material of thin film 22, in turn causing an increase of the current flow through the circuit until the reed member is deflected to its extreme opposite position, thus decreasing the current flow through the circuit. In this manner, the current flowing through the circuit of FIG. 1, as schematically represented in FIG. 6, is constantly modulated at a frequency corresponding to the natural resonant frequency of the reed member 10, such that the arrangement of FIG. 1, having the equivalent circuit of FIG. 6, forms an electromechanical oscillator having a predetermined frequency of operation depending upon the physical dimensions of the reed member 10.

A voltage signal of the frequency determined by the natural resonant frequency of the reed member 10 appears across the piezoresistive element 22 and supplies an output at terminals 38 and 40. With P-type germanium coating of a thickness of about 2,000 angstroms forming the thin film 22, the variation of resistance of the thin film in function of the deflection of the reed member 10 is substantially linear as shown by curve 42 of FIG. 5, provided that the superimposed films forming the transducer 18 have a total thickness which is at most equal to one one-thousandth of the thickness of the reed member 10. It has been found that if such dimensional proportions are respected, the system has a gage factor in excess of 20, the gage factor being defined as the ratio of the relative resistivity of the transducer 18 to the relative length of the reed member 10. The relative resistivity of the transducer is in turn defined as the ratio of its resistivity change to its original resistivity. The gage factor is represented by the slope of curve 42 of FIG. 5.

Referring now to FIG. 4, a modification of the invention is shown as being provided with two symmetrically disposed piezoresistive transducer 18 and 18', transducer 18' being made in the same manner as transducer 18 and consisting preferably of a dielectric thin film 20' provided with a thin film of current conductive material forming a first electrode 22' for a thin film of piezoresistive material 24' having a second electrode 26'. Transducer 18' is provided with terminals 20' and 30' and the arrangement of FIG. 4 may be incorporated in a circuit as represented at FIG. 7 so as to form a constant frequency oscillator by having the piezoresistive thin film 22 and 22' of transducer 18 and 18', respectively, connected in a bridge fashion with a couple of resistors 40 and 42, the DC power supply 34 being applied across one diagonal of the bridge through switch 32, and the inductance coil 36 being connected across another diagonal of the bridge, such that the inductance coil 36 is connected between the common terminal of the transducers and the common terminal of the resistors 40 and 42. By means of the arrangement of FIG. 7, when switch 32 is closed, current flows in parallel through the first branch of the bridge defined by piezoresistive thin films 22 and 22' and through the second branch of the bridge defined by resistors 40 and 42. The value of resistors 40 and 42 is selected such that the bridge is not initially in a null condition with the result that a voltage differential appears across the ends 44 and 46 of coil 36. Consequently, a current flow through coil 36, thus causing the reed member 10 to deflect, which imposes a stress upon the piezoresistive thin films 22 and 22', whose resistances change such as to cause a drop of current through inductance coil 36. The operation of the device of FIG. 1 when electrically connected as shown in FIG. 7 is consequently substantially alike the hereinbefore described arrangement of FIG. 1. In this manner by proper selection of the elements, for providing a loop gain greater or equal to one, oscillation of the reed member occurs and is automatically established and maintained at a constant amplitude and frequency. If it is desired to obtain an electrical output signal of the frequency determined by the frequency of vibration or oscillation of the reed member, such output signal may be tapped across terminals 44 and 46 of the induction coil 36, or alternately, across any one of the transducers 18 or 18'.

It can thus be seen that the present invention provides for an electromechanical oscillator device including a vibrating reed whose physical characteristics determine the frequency of the oscillator, although it is obvious that the device of the invention can also be utilized as a filter having a very narrow band width by supplying to the drive coil 36 a driving signal having a frequency corresponding to the natural resonant frequency of the reed element.

Having thus described the invention by way of the few examples herein described and illustrated for illustrative purpose only, modifications whereof will be apparent to those skilled in the art, what is sought to be protected by United States Letters Patent is as follows:

I claim:

1. A frequency sensitive electromechanical vibrating device comprising a base member, an elongated mechanically resonate reed member having a first end free to vibrate and a second end secured to said base member, a piezoresistive transducer defined by a substantially thin film of piezoresistive material on the surface of said reed member at a portion thereof caused to flex when said reed member vibrates, said thin film being provided with current conductive electrodes for connection to an electrical circuit, and an inductance coil electrically connected in series with a source of DC current and said electrodes and being operative to electromagnetically drive said reed member.

2. A frequency sensitive electromechanical vibrating device, comprising a base member, an elongated mechanical resonant reed member having a first end free to vibrate and the second end secured to said base member, a piezoresistive transducer defined first by a substantially thin film of piezoresistive on a first surface of said reed member at a portion thereof caused to flex when said reed member vibrates, said first thin film being provided with current conductive electrodes for connection to an electrical circuit, a second piezoresistive transducer defined by a substantially thin film of piezoresistive material symmetrically disposed on the second face of said reed member at said portion thereof, said second thin film being provided with current conductive electrodes for connection to an electrical circuit, an inductance coil for electromagnetically driving said reed member, a pair of resistors, a source of DC current, and circuit means interconnecting said first and second thin films in a bridge with said pair of resistors and connecting said inductance coil across one diagonal of said bridge and connecting said source of DC current across the other diagonal bridge, said source of DC current being connected across the common terminal of an electrode of one of said thin films and of one of said resistors and a common terminal of an electrode of the other of said thin films and the other of said resistors.

* * * * *